US005573570A

United States Patent [19]
Leidy et al.

[11] Patent Number: 5,573,570
[45] Date of Patent: Nov. 12, 1996

[54] GLASS GOB SHEARING APPARATUS

[75] Inventors: D. Wayne Leidy, Perrysburg; Carl E. Denlinger, Maumee, both of Ohio

[73] Assignee: Owens-Brockway Glass Container Inc., Toledo, Ohio

[21] Appl. No.: 322,121

[22] Filed: Oct. 13, 1994

[51] Int. Cl.[6] ........................................ C03B 7/10
[52] U.S. Cl. .................. 65/334; 65/304; 65/158; 65/160
[58] Field of Search ................ 65/334, 304, 158, 65/160, DIG. 13, 126, 127, 128, 129, 133; 91/386

[56] References Cited

U.S. PATENT DOCUMENTS

| | | | |
|---|---|---|---|
| 1,994,123 | 11/1931 | Curtis, Jr. | 65/158 |
| 2,252,392 | 8/1941 | Benoit et al. | 65/158 |
| 3,333,937 | 8/1967 | Tatsak | 65/334 |
| 3,758,286 | 9/1973 | Heyne | 65/334 |
| 3,788,194 | 1/1974 | Burns | 91/386 |
| 4,099,450 | 7/1978 | Mase | 91/403 |
| 4,174,647 | 11/1979 | Dahms | 83/58 |
| 4,305,747 | 12/1981 | Kirkman et al. | 65/128 |
| 4,374,659 | 2/1983 | Davey | 65/334 |
| 4,388,100 | 6/1983 | Marroquin | 65/334 |
| 4,427,431 | 1/1984 | Mumford et al. | 65/163 |
| 4,499,806 | 2/1985 | Mumford | 83/527 |
| 4,699,643 | 10/1987 | Kulig | 65/332 |
| 4,728,354 | 3/1988 | Vilk et al. | 65/334 |
| 4,813,994 | 3/1989 | Kulig | 65/334 |
| 4,961,773 | 10/1990 | Takahara et al. | 65/174 |
| 5,405,424 | 4/1995 | Steffan et al. | 65/158 |

*Primary Examiner*—Donald E. Czaja
*Assistant Examiner*—Calvin Padgett

[57] ABSTRACT

A parallel shear apparatus (10) for sequentially shearing each of a plurality of streams of molten glass (A,B,C, D) from a glass feeder into gobs for processing into glass containers by a glass forming machine. The apparatus (10) has first and second opposed carriages (12, 14) which are reciprocable along parallel slides (16, 18, 20) toward and away from one another, each of the carriages carrying one or more opposed knife elements (32a, etc., 34a, etc.), corresponding to the number of streams of molten glass, and the opposed knife elements (32a, 34a, etc.) overlap at the innermost limits of their travel to perform the shearing action. Motion of the carriages (12, 14) is actuated by a unidirectionally acting servo motor (36), which imparts oscillating motion to a bell crank (22) through a connecting rod (46). The oscillating motion of the bell crank (22) imparts simultaneous, opposed, rectilinear motion to the carriages (12, 14) through connecting rods (26, 30), which are pivotally attached to the servo motor (36) at diametrically spaced apart locations.

9 Claims, 4 Drawing Sheets

005,573,570

GLASS GOB SHEARING APPARATUS

FIELD OF THE INVENTION

This invention relates to apparatus for sequentially shearing each of a multiplicity of streams of molten glass into individual gobs. More particularly, this invention relates to apparatus of the foregoing character in which opposed sets of shearing knife elements are simultaneously moved toward and away from one another along opposed, rectilinear paths to overlap in shearing relationship approximately at the longitudinal central axes of the streams of molten glass which are being sheared.

BACKGROUND OF THE INVENTION

In the manufacture of glass containers by a forming machine of the I.S. ("individual section") type, one or more streams of molten glass flow downwardly from a feeder bowl of a glass melting furnace forehearth toward a section of the molding machine, and each stream is severed or sheared into a multiplicity of individual gobs by a shearing device positioned between the feeder bowl and the molding machine section. A typical shearing device of the foregoing character includes an opposed set of shear knife elements, each set of shear knife elements being mounted on a carriage assembly, and driving apparatus for reciprocating each of the carriage assemblies toward and away from one another. A shearing device of this general character is disclosed in U.S. Pat. No. 4,813,994 (Kulig). Heretofore, such driving apparatus typically utilized a mechanical cam arrangement in the driving of the carriage assemblies. Such a cam arrangement inherently is limited in the speed that can be imparted to the carriage assemblies, and this speed limitation can act as a capacity limitation on the forming machine. Further, in such a cam arrangement the contact time between the shear knife elements and the glass stream(s), which is an important factor in the quality of the shearing action, cannot be adjusted without suspending the operation of the forming machine to permit a change in the cams.

SUMMARY OF THE INVENTION

The foregoing and other problems and limitations of shearing devices for use with I.S. glass container forming machines are overcome with the shearing apparatus of the present invention, which uses a unidirectionally acting servo motor connected to an arm or throw of a bell crank to drive the opposed shear knife carriage assemblies of the shearing apparatus through separate connecting rods. Such a drive arrangement imparts harmonic movement characteristics to the shear knife carriages. Further, with such a drive arrangement control of the operating speed of the servo motor, and control of the degree of overlap of the knife elements in their shearing positions, can be made during the operation of the shear device. As a result of these control characteristics, close control of the "time under glass" of the shear device, that is, the contact time between the molten glass stream(s) and the shear knife elements, is provided. Further still, control of the speed of the servo motor can be very conveniently integrated with control of the positions of the needles that are used in conjunction with the feeder orifices to control the rate of glass flow from the feeder orifices.

Accordingly, it is an object of the present invention to provide an improved parallel shear device for a glass forming machine of the individual section type. More particularly, it is an object of the present invention to provide a parallel shear device of the foregoing character whose "time under glass" can be more closely controlled regardless of forming machine speed or speed changes and whose "time under glass" can be quickly changed, when desired, without having to interrupt forming machine production. It is also an object of the present invention to provide a parallel shear device of the foregoing character in which the overlap of the shearing knife elements, in their shearing positions, can be conveniently adjusted without suspending operation of the forming machine that is associated with such shear device.

For a further understanding of the present invention and the objects thereof, attention is directed to the drawing and the brief description thereof, to the detailed description of the preferred embodiment of the invention, and to the appended claims.

IN THE DRAWING

DETAILED DESCRIPTION OF THE PREFERRED EMBODIMENT

Figure 1:
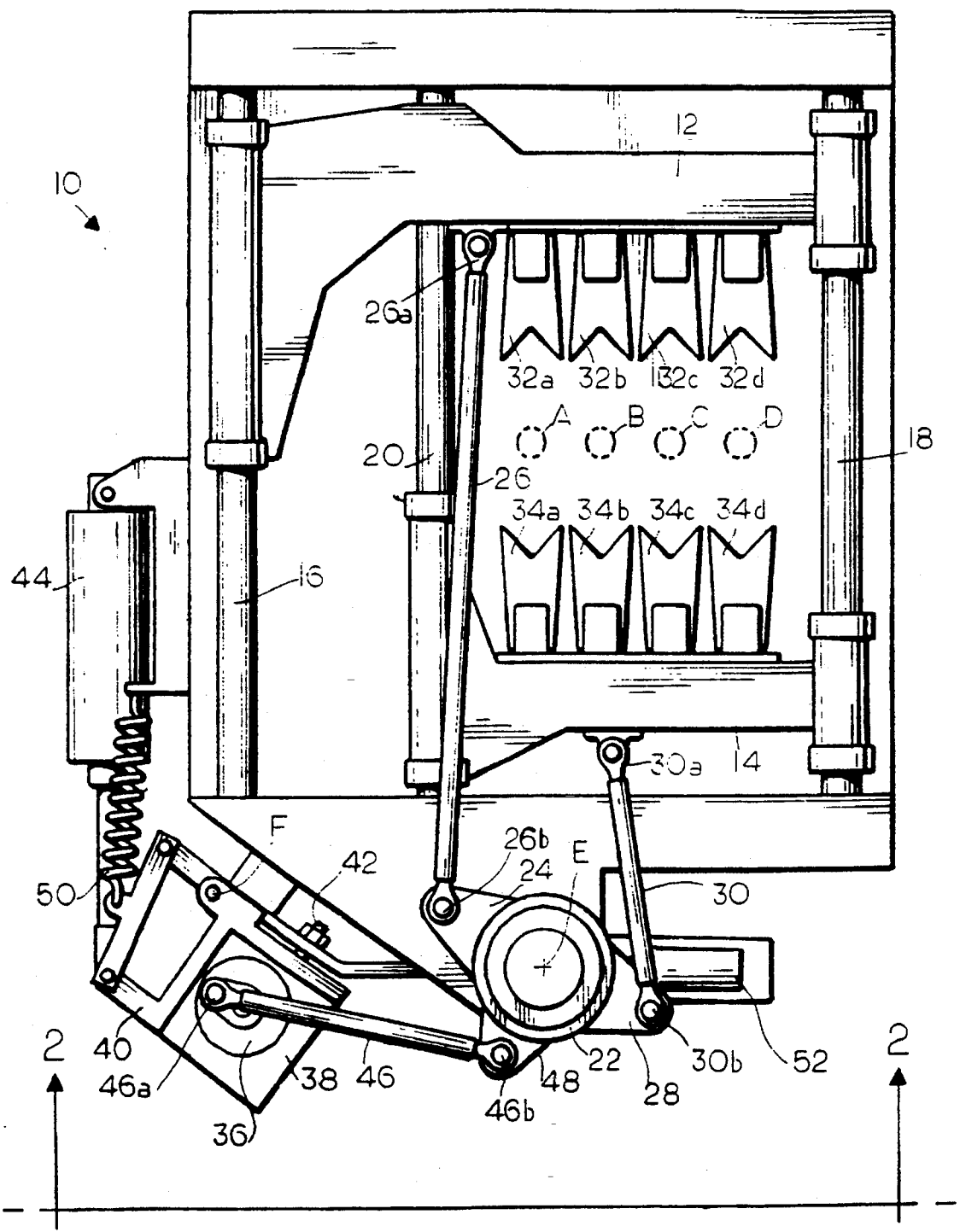
FIG. 1 is a plan view of a parallel shear apparatus for a glass forming machine, the parallel shear apparatus depicted therein incorporating the preferred embodiment of the present invention.

A parallel shear apparatus or device according to the preferred embodiment of the present invention is indicated generally by reference numeral 10 in FIG. 1 and includes opposed shear knife carriages 12 and 14. The carriages 12 and 14 are mounted for reciprocating motion toward and away from one another, the carriage 12 being slidable along stationary slide rods 16 and 18 and the carriage 14 being slidable along stationary slide rods 18 and 20.

The motion of the carriages 12 and 14 is rectilinear, and is simultaneously actuated by an oscillating bell crank 22. In that regard, the carriage 12 is connected to a throw 24 of the bell crank 22 by a connecting rod 26, an end 26a of which is pivotally attached to the carriage 12 and the other end 26b of which is pivotally attached to the throw 24 of the bell crank 22. Likewise, the carriage 14 is connected to a throw 28 of the bell crank 22 by a connecting rod 30, an end 30a of which is pivotally attached to the carriage 14 and the other end 30b of which is pivotally attached to the throw 28, the throws 24 and 28 being diametrically opposed to one another in their positions in relation to the bell crank 22.

The carriage 12 carries one or more shear knife elements, shown as four shear knife elements 32a, 32b, 32c and 32d, one for each of the molten glass streams flowing from the glass feeder thereabove (not shown) with which the shear mechanism 10 is associated. Similarly, the carriage 14 carries a like number of shear knife elements, shown as shear knife elements 34a, 34b, 34c and 34d. As the bell crank 22 is caused to oscillate, by means which will hereinafter be described more fully, the carriages 12 and 14 are caused to move toward and then away from one another, to periodically bring the opposed shear knife elements, 32a and 34a, 32b and 34b, 32c and 34c, and 32d and 34d, respectively, into partly overlapping relationship with one another to thereby shear streams of molten glass flowing downwardly therebetween, at the locations identified by the broken line circles A, B, C and D, respectively. This action of the carriages 12, 14, and the shear knife elements carried by each of them, will separate the molten glass streams at the locations A, B, C and D, respectively, into individual glass gobs for further processing into individual glass containers by a glass forming machine of the individual section type, not shown, which is positioned below the shear mechanism 10.

The motion imparted to the carriages 12, 14 by the bell crank 22 through the connecting rods 26, 30 will be harmonic in its velocity and acceleration characteristics. This will minimize inertial loads on the carriages 12, 14 and thereby minimize wear on them.

The bell crank 22 is caused to oscillate about its central axis E by a unidirectionally acting a.c. servo motor 36, gear reducer 38 combination, which is mounted on a bracket 40 that is pivoted in relation to the fixed structure of the shear mechanism 10 about a central axis F. The bracket 40 is biased against an adjustable stop 42 by a double acting pneumatic cylinder 44, and the position of the bracket 40, which is fixed in relation to the position of the central axis E of the bell crank 22, determines the amount or degree of overlap of the knife elements 32a and 34a, etc., at the innermost limits of their rectilinear motion. Thus, the degree overlap of the knife elements in their shearing position may be rapidly and easily made while the shear mechanism 10 is operating, without 35 the need to interrupt the operation of the associated forming machine. The rotational movement of the servo motor 36 is transmitted to the bell crank 22 by a connecting rod 46, an end 46a of which is pivotally attached to the servo motor 36 at a location away from the axis of rotation of the servo motor 36, and the other end 46b of which is pivotally attached to a throw 48 of the bell crank 22 at a location between, and spaced from each of, the throws 24 and 28.

Failsafe operation of the shear mechanism 10 is ensured by providing a tension spring 50, which acts on the bracket 40 to retract the bracket 40 about its pivot axis F from its location against the adjustable stop 42 in the event of a loss of air pressure in the cylinder 44. Thus, the spacing between the carriages 12 and 14 will be increased to the point where there will be no overlap between their opposed knife elements, 32a and 34a, etc., even at the innermost limits of their travel, until proper operating conditions can be restored. A pneumatic safety latch mechanism 52 is also provided to latch the bell crank 22 against oscillating motion in the event of the loss of air pressure to the cylinder 44 or the loss of power to or failure of the servo motor 36.

Figure 3:
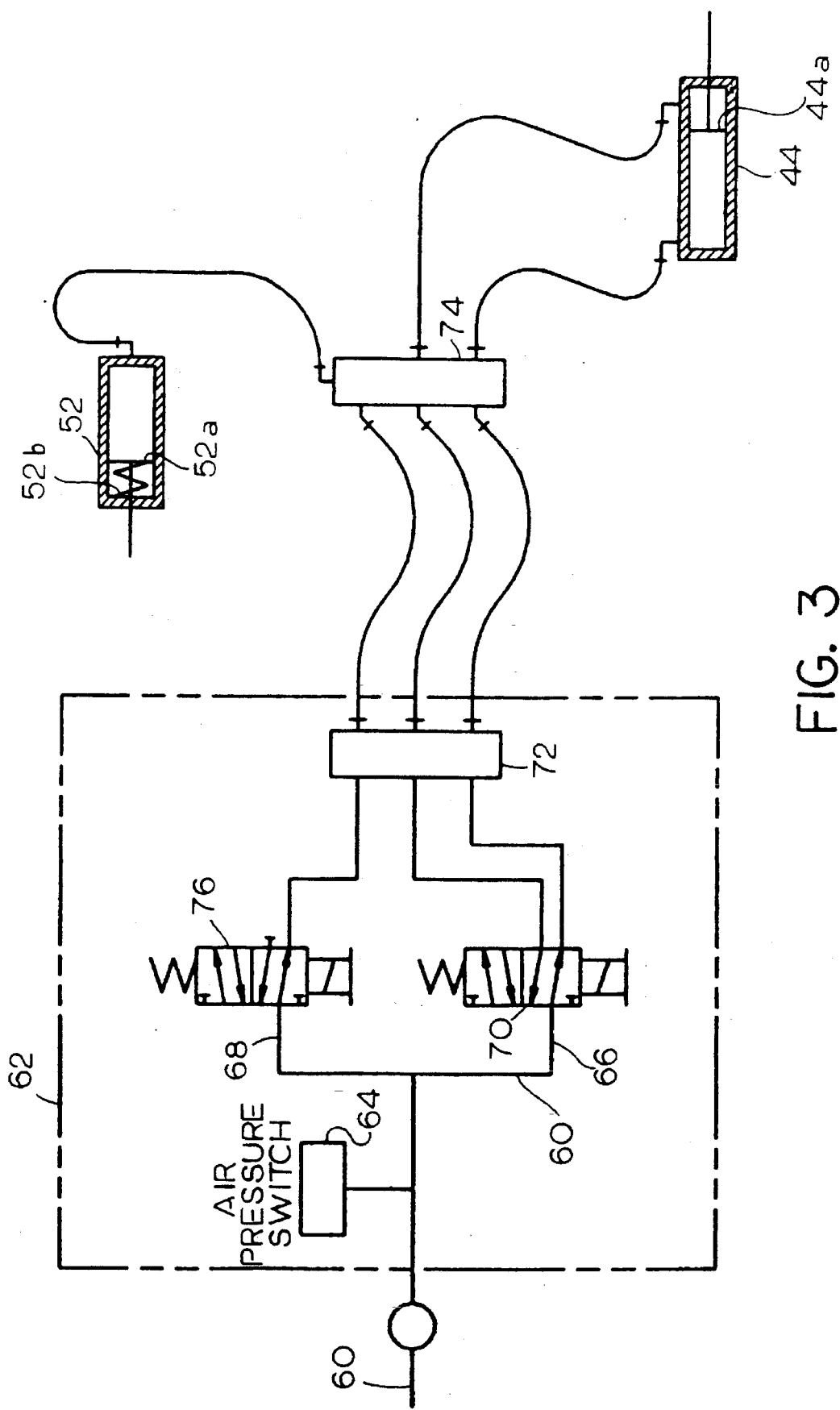
FIG. 3 is a schematic view of the pneumatic circuitry for actuating the pneumatic operators of the apparatus of FIGS. 1 and 2.

A control system for the operation of the cylinder 44 and the pneumatic latch mechanism 52 is illustrated in FIG. 3, and utilizes a supply of clean, regulated pressurized air in a supply line 60. Air in the supply line 60 enters a control cabinet 62, within a structure whose limits are indicated by a broken line, and the control cabinet 62 incorporates a pressure switch 64. The pressure switch 64 acts to break the flow of air through the supply line 60 in the event that the air pressure in the supply line 60 falls below a predetermined value. The compressed air in the supply line 60 is delivered, at locations downstream of the pressure switch 64, to a first branch line 66 and a second branch line 68.

The pressurized air in the branch line 66 is delivered to one or another of the operating sides of a piston 44a of the double acting cylinder 44 through a solenoid valve 70 from a supply manifold 72 in the control cabinet 62 and a second supply manifold 74 which is external to the control cabinet 62. The solenoid valve 70 is a two-position valve of a conventional type, and its operating position is electrically or electronically controlled, for example, by wiring it into the emergency shutoff circuitry, not shown, for the shear device 10, to move the solenoid valve to its non-operating position and thereby cause the piston 44a of the cylinder 44 to move to advance the bracket 44 against the adjustable stop 42.

The pressurized air in the branch line 68 is delivered to the only operating side of a piston 52a of the single acting safety latch 52 through a solenoid valve 76, the supply manifold 72 and the second supply manifold 74. The solenoid valve 76, like the solenoid valve 70, is a two-position valve of a conventional type, and its operating position is similarly electrically or electronically controlled to move the solenoid valve to a non-operating position in the event of an emergency and thereby to permit a spring 52b of the pneumatic safety latch 52 to bias the piston 52a from its non-engaged position, as depicted in FIG. 3, to its engaged position, in which it will block the oscillation of the bell crank 22.

Figure 2:
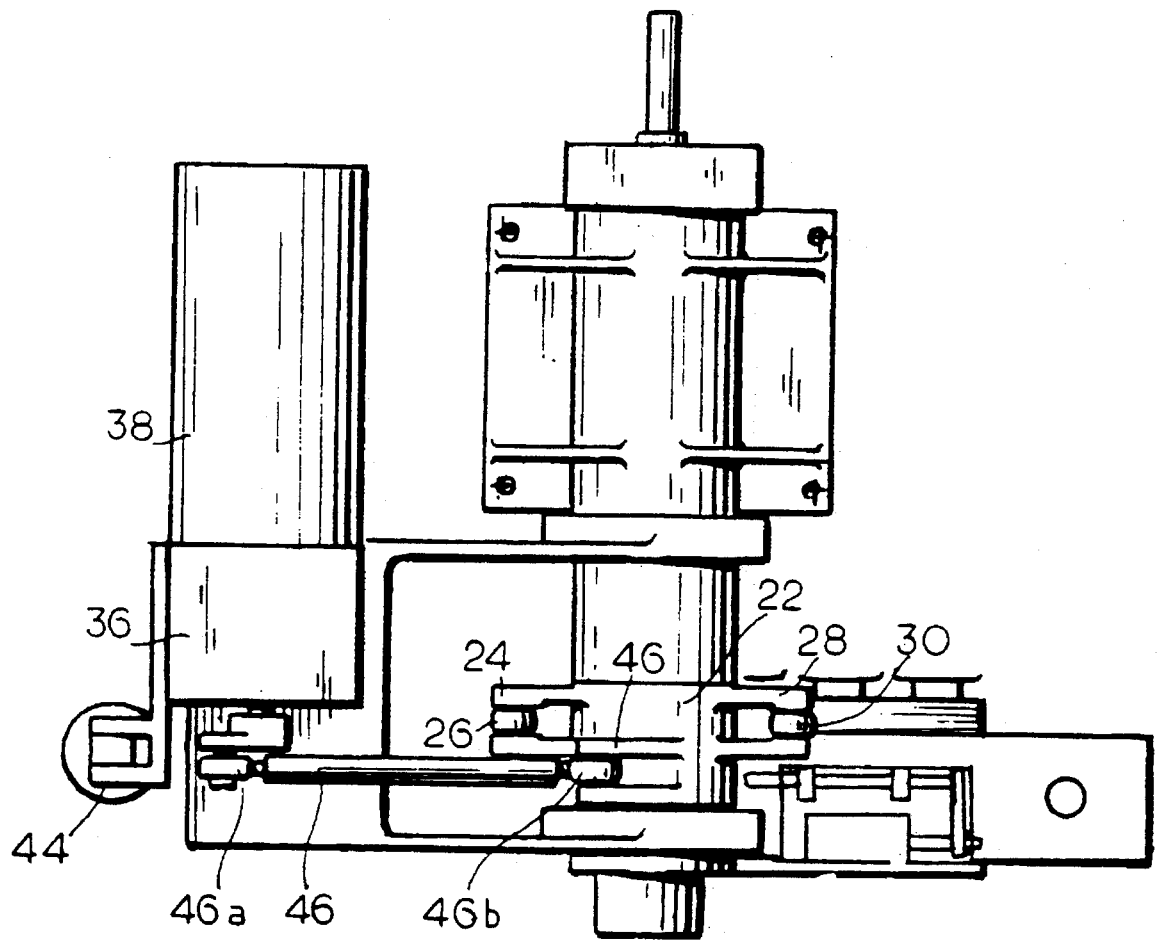
FIG. 2 is an elevational view of the apparatus of FIG. 1 taken on line 2—2 thereof.
Figure 4:
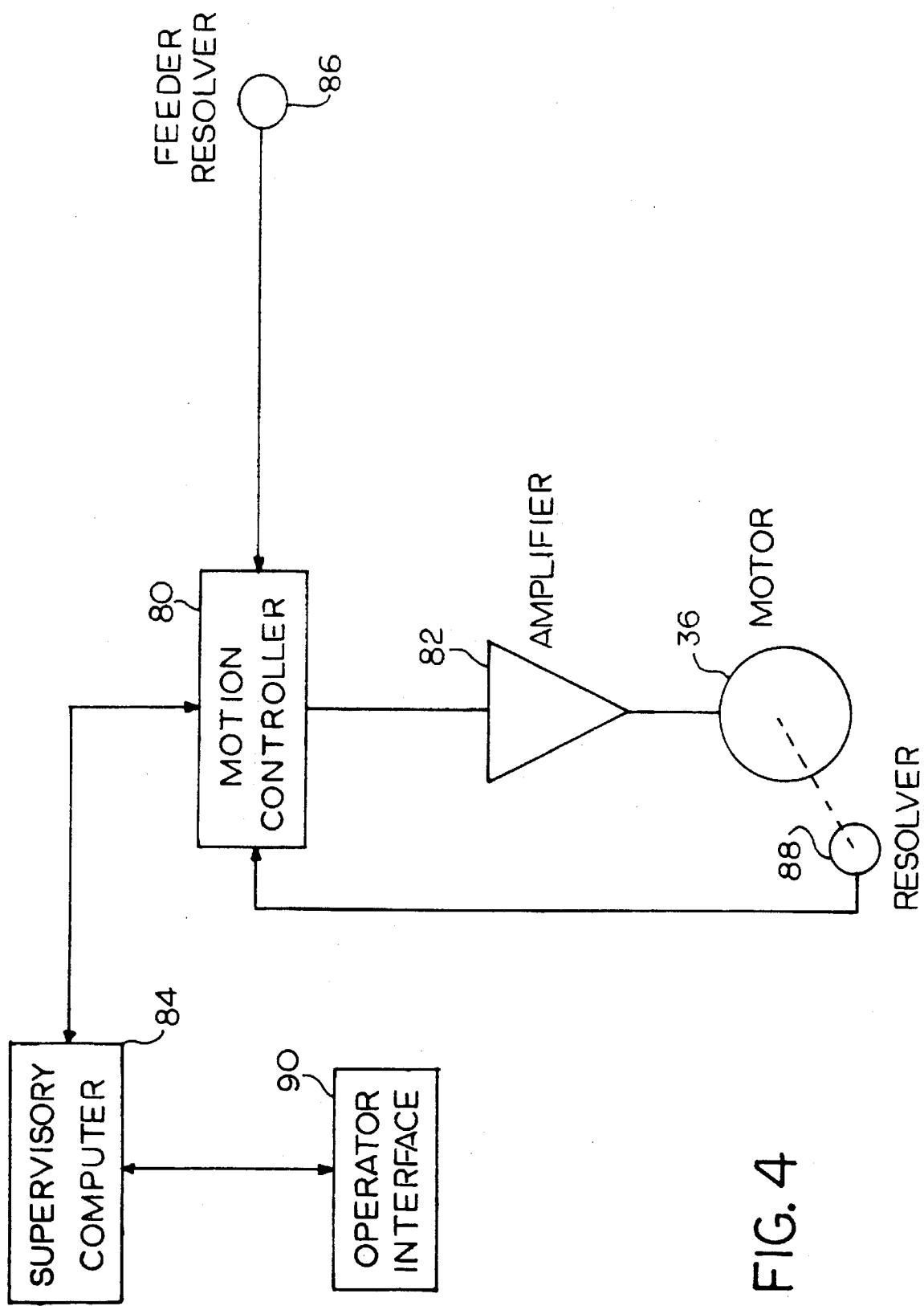
FIG. 4 is a schematic view of the control system for controlling the operation of the electrical motor of FIGS. 1 and 2.

Control of the operation of the apparatus of FIGS. 1–3, as heretofore described, can be accomplished by means of the control system that is illustrated in FIG. 4. As shown, the operation of the a.c. servo motor 36 is controlled by a motion controller 80 which acts on the servo motor 36 through a power amplifier 82. The motion controller 80, which acts under the command of a supervisory computer 84, has in its memory a motion profile which is generated by the supervisory computer 84, and this memory profile determines the position of the knife elements 32a, 34a, etc., in relation to the needles of the feeder bowl (not shown). In achieving this control result, the motion controller utilizes a signal indicative of the positions of the needles, as received from a resolver or feedback device 86, such as the resolver which is described in U.S. Pat. No. 4,427,431 (Mumford), and a signal indicative of the position of a rotor of the servo motor 36, as received from a second resolver or feedback device 88 of a similar nature. In that regard the resolver 86 is preferably mounted in the same place where the shear cam for prior art mechanical shears would be located, and in such an arrangement provides a signal indicative of the absolute position of the output shaft of the gearbox that is used to control the movement of the needles. Likewise, the resolver 88 is preferably mounted on the back of the servo motor 36, and in such an arrangement will serve to provide a signal indicative both of the position of the rotor of the servo motor 36 and of the positions of the carriages 12, 14.

In a control system as described, the supervisory computer 84 will calculate a motion profile for the motion controller 80 based on the speed of the associated forming machine and the desired "time under glass" for the knife elements 32a, 34a, etc., of the parallel shear apparatus 10. Thus, this motion profile will control the position to position relationship between the output shaft of the feeder needle gearbox and the desired positions of the knife elements 32a, 34a, etc. This relationship can be readily changed, when desired, by an operator through an operator interface 90, which permits rapid reprogramming of the supervisory computer 84.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. Apparatus for shearing a plurality of streams of molten glass from a glass feeder into individual gobs of molten glass for processing into glass containers in a forming machine, said apparatus comprising:

first shearing means comprising a first plurality of knife elements;

second shearing means comprising a second plurality of knife elements;

mounting means for mounting said first shearing means for motion toward and away from said second shearing means and for mounting said second shearing means for parallel motion toward and away from said first shearing means;

a unidirectionally acting servo motor; and connecting means connecting said servo motor to said first shearing means and to said second shearing means for simultaneously moving said first shearing means and said second shearing means toward one another and then away from one another, said connecting means comprising:

a bell crank having a central axis;

first connecting rod means connecting said servo motor to said bell crank for imparting oscillating motion to said bell crank about its central axis;

second connecting rod means connecting said bell crank to said first shearing means for imparting reciprocating motion to said first shearing means; and third connecting rod means connecting said bell crank to said second shearing means for imparting reciprocating motion to said second shearing means;

said second connecting rod means and said third connecting rod means being pivotally attached to said servo motor at diametrically spaced apart locations thereof.

2. Apparatus according to claim 1 and further comprising:

a pivoting bracket;

said servo motor being mounted on said pivoting bracket;

an adjustable stop means for controllably limiting the pivoting movement of said pivoting bracket;

pneumatic means for biasing said pivoting bracket against said adjustable stop means; and spring means acting on said pivoting bracket to retract said pivoting bracket from said adjustable stop means upon loss of air pressure to said pneumatic means.

3. Apparatus according to claim 2 and further comprising:

pneumatic latch means operable upon loss of air pressure thereto to latch said bell crank against oscillating motion.

4. Apparatus according to claim 3 and further comprising:

control means for controlling the operation of said servo motor as a function of the flow rate of the at least one stream of molten glass.

5. Apparatus for shearing at least one stream of molten glass from a glass feeder into individual gobs of molten glass for processing into glass containers in a forming machine, said apparatus comprising:

first shearing means comprising at least one knife element;

second shearing means comprising at least one knife element;

mounting means for mounting said first shearing means for motion toward and away from said second shearing means and for mounting said second shearing means for motion toward and away from said first shearing means;

means for repetitively simultaneously moving said first shearing means and said second shearing means toward and away from one another to permit separation and overlap of the at least one knife element of said first shearing means and the at least one knife element of said second shearing means;

a first resolver for providing a first reference signal representing the position of feeder needles of a glass melting furnace forehearth feeder bowl;

a second resolver for providing a second reference signal representing the position of said first shearing means and said second shearing means;

a supervisory signal means for supplying a digital command signal representing a selected position of said first shearing means and said second shearing means as they move toward and away from one another; and a servo control means responsive to said digital command signal and to said first and second reference signals for moving said first shearing means and said second shearing means to said selected position;

whereby the at least one knife element of said first shearing means and the at least one knife element of said second shearing means may be aligned with the feeder needles and the speed at which the at least one knife element of said first shearing means and the at least one knife element of said second shearing means move along said linear paths may be varied.

6. Apparatus according to claim 5, wherein said supervisory signal means includes means for comparing said first reference signal and said second reference signal and means responsive to such comparison for determining the motion profile for said servo control means.

7. Apparatus according to claim 5, wherein said servo control means comprises:

a unidirectionally acting servo motor; and connecting means connecting said servo motor to said first shearing means and to said second shearing means for simultaneously moving said first shearing means and said second shearing means to and from said selected position to permit separation and overlap of the at least one knife element of said first shearing means and the at least one knife element of said second shearing means and to thereby repetitively sever the at least one stream of molten glass into individual gobs.

8. Apparatus according to claim 5, wherein said servo control means include a power amplifier responsive to said command signal for driving said servo motor.

9. Apparatus according to claim 5, further comprising;

an operator interface for electrically modifying said supervisory signal means.

* * * * *